United States Patent [19]

Heian

[11] 4,304,550
[45] Dec. 8, 1981

[54] APPARATUS FOR HANDLING AND UTILIZING SYSTEM GAS IN A PYRO-PROCESSING SYSTEM

[75] Inventor: Glenn A. Heian, Franklin, Wis.

[73] Assignee: Allis-Chalmers Corporation, Milwaukee, Wis.

[21] Appl. No.: 176,664

[22] Filed: Aug. 11, 1980

Related U.S. Application Data

[62] Division of Ser. No. 41,233, May 21, 1979, Pat. No. 4,251,280.

[51] Int. Cl.³ .............................................. F27B 7/02
[52] U.S. Cl. ...................................... 432/72; 432/106
[58] Field of Search ................... 432/72, 106; 106/100

[56] References Cited

U.S. PATENT DOCUMENTS

| | | | |
|---|---|---|---|
| 4,120,645 | 10/1978 | Heian et al. .......................... | 432/106 |
| 4,162,922 | 7/1979 | Herchenbach ...................... | 106/100 |
| 4,226,831 | 10/1980 | Dilworth .............................. | 422/173 |

*Primary Examiner*—John J. Camby
*Attorney, Agent, or Firm*—Robert C. Jones

[57] ABSTRACT

Emission gas to be scrubbed of sulfur dioxide or the like has turbulent flow through a mixing vessel. At a mixing zone in the vessel, comminuted lime is fed into the gas and carried out of the vessel with the gas to a cyclone separator. A substantial portion of the dust from the cyclone is recycled back to the mixing zone of the mixing vessel. The gas from the cyclone is passed through a quench zone and excess dust from the cyclone is introduced into the gas stream for additional sulfur-dioxide removal, and quenching of the gas and dust from the cyclone is accomplished in a quenching zone prior to the gas being utilized in the system. Off-gas from the preheat zone which contains unburned combustibles is burned in a booster heater with the heat being utilized as process heat. Excess preheat off-gas not required for preheat process is delivered to a second combustion furnace for burning the combustibles therein and the heat utilized for drying. From the quench zone the gas passes to two dust separators with the cleansed gas being utilized in up-draft and down-draft drying zones. The dust from the two separators and from the grate is passed to a final dust separator where dust is removed from the gas. Make-up lime is fed to the mixing zone from a suspension calcining furnace, reaching the mixing zone while still heated.

13 Claims, 1 Drawing Figure

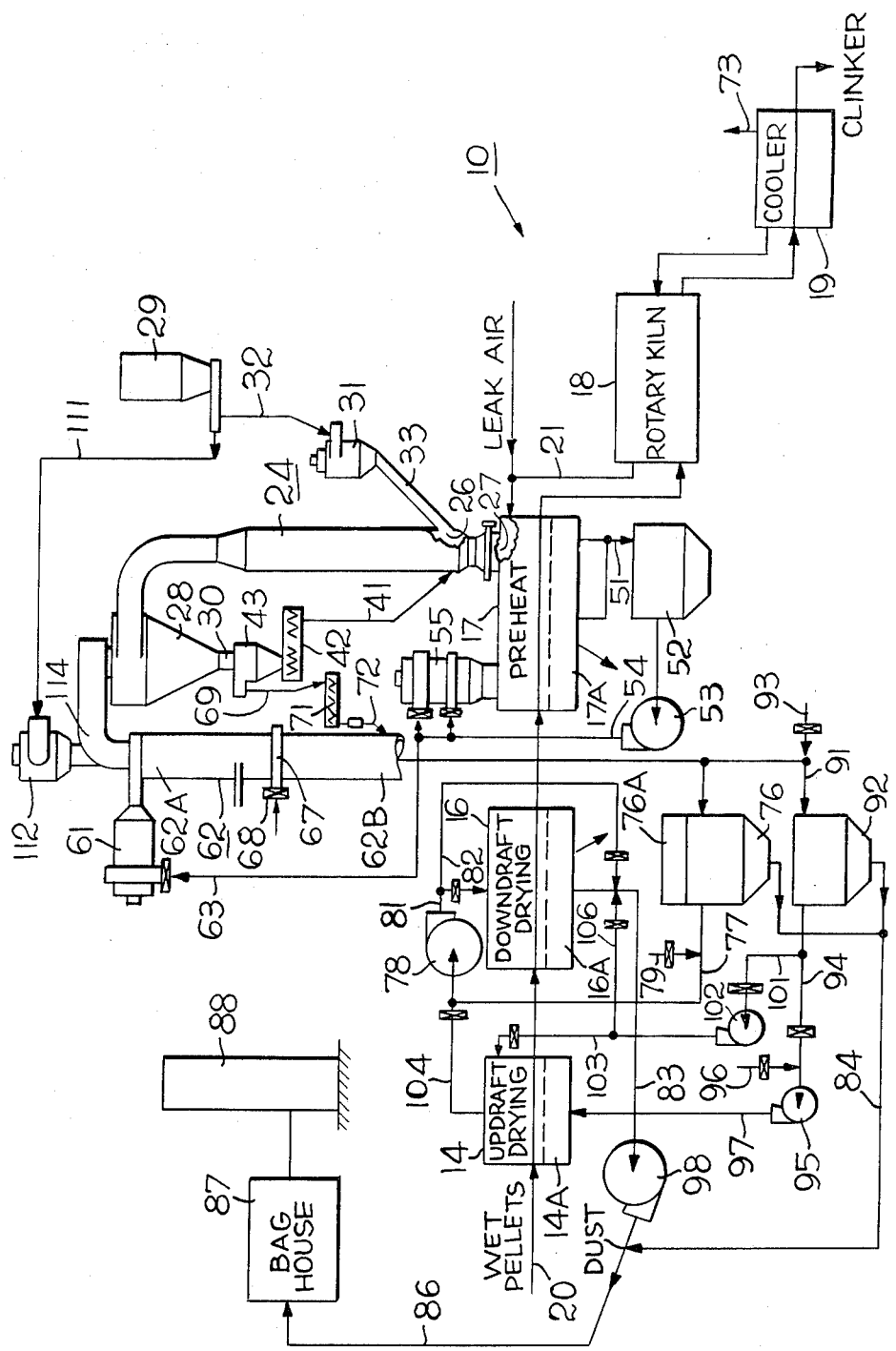

APPARATUS FOR HANDLING AND UTILIZING SYSTEM GAS IN A PYRO-PROCESSING SYSTEM

This is a division of application Ser. No. 041,233 filed May 21, 1979, now U.S. Pat. No. 4,251,280.

FIELD OF THE INVENTION

This invention relates to a method and apparatus for utilizing and handling system gas so as to better optimize kiln and grate conditions and reduce the volume of ambient air, thereby reducing the heat consumption and the volume of gas that must be handled and therefore reducing the cost of operating the system.

BACKGROUND OF THE INVENTION

In view of the increase cost of energy, a major consideration in the operating cost of a pyro-processing system is its energy economy. It is also of importance that gas be cleaned prior to venting to stack and not in itself be a source of pollution.

A general object of the present invention is to recycle preheat off-gas and utilize the heat therein for the system.

Still another object of the present invention is to boost the temperature of the preheat gas and utilize this gas in the grate.

Yet another object of the present invention is to by-pass a higher concentration of dirty gas from the kiln by reducing the gas flow through the kiln.

A further object of the present invention is to provide a means whereby it is possible to balance kiln conditions to improve kiln system operating conditions and minimize waste gas temperature.

A still further object of the present invention is to provide for two recycle potentials: (1) preheat gas recycle; and, (2) up-draft drying gas recycle.

A further object of the present invention is to effect an operating cost reduction by burning unburned kerogen volatiles, utilizing the heat therefrom as system heat.

Still another object of the present invention is to remove dust from the gas before it is utilized in the system to protect the equipment.

Another object of the present invention is to reduce $SO_2$ emissions which are passed to the atmosphere from about 2000 p.p.m. to at least 200 p.p.m., thereby reducing system fouling and also meeting environmental standards.

SUMMARY OF THE INVENTION

Preheat gas is recycled to a booster air heater which is in communication with the preheat chamber so that the temperature of the preheat off-gas is raised and directed back into the preheat chamber for greater efficiency. Excess gas is directed to a combustion chamber which is in communication with the combustion quench duct so that the temperature of the gas is lowered and utilized in the down-draft drying chamber and also in the up-draft drying chamber. Removal of $SO_2$ is accomplished and the cleansed gas used to reduce energy costs.

DESCRIPTION OF THE DRAWINGS

The single FIGURE of the drawing is a diagrammatic view of a grate kiln system incorporating the features of the present invention.

DETAILED DESCRIPTION OF THE INVENTION

The invention about to be described incorporates features of a cleansing system for removing pollutant gas such as sulfur dioxide ($SO_2$) shown and described in an application to Louis R. Dilworth, Ser. No. 021,026, filed Mar. 16, 1979 now U.S. Pat. No. 4,226,821 and assigned to assignee of the present invention. Thus, recourse may be had to the aforementioned Dilworth application for a more detailed description of the scrubbing system therein described.

A grate kiln system 10 is diagrammatically shown in FIG. 1 and includes an up-draft drying zone or chamber 14 having a positive-pressure wind box or chamber 14A; a down-draft drying zone or chamber 16, having a negative-pressure wind box or chamber 16A; and, a preheat zone or chamber 17 having a negative-pressure wind box 17A, all being connected in series flow-relationship in the usual manner. A traveling grate indicated by the material flow line 20 progresses the wet agglomerate material through the up-draft drying, down-draft drying and preheat zones with the material being discharged into a kiln 18 and thence to a cooler 19. Gas from the inlet end of kiln 18 flows through the preheat chamber 17 via a conducting duct means 21 in the usual manner.

The gas flow from the kiln 18 is commonly designated as dirty gas containing gaseous pollutants such as a high percentage of sulphur dioxide ($SO_2$). This so-called dirty gas originates by reason of the nature of the material being treated and the fuel being fired which contain a high percentage of sulphur. The dirty gas flow from the kiln 18 to be bypassed passes through the preheat zone 17 and into an adsorption vessel 24 which is in communication with the interior of the preheat chamber. An inlet 26 for admission of comminuted sorbent material is provided in the vessel 24. The inlet 26 is positioned near the inlet 27 of the vessel 24 through which the kiln gas enters. The mixed gases and sorbent material pass out of the vessel 24 into a cyclone separator 28. A supply source of the comminuted limestone is represented by a hopper 29 which is connected to a calcining furnace 31 by a duct 32. Although the lime powder or dust fed to the vessel 24 via a duct 33 through the inlet 26 can be obtained from any source, and could be calcined in any desired manner, there are several advantages in feeding comminuted limestone or the like to the illustrated furnace 31 and then directly feeding the rapidly calcined lime powder to the vessel 24. By reason of this arrangement the limestone is quickly and controllably calcined at the rate it is needed, in a continuous process. More importantly, the material enters the vessel 24 while still retaining substantially all of the heat imparted to it during the rapid calcining operation, so that at least a substantial part of the energy needed for calcining is conserved to be available for the scrubbing operation itself.

Gas from the kiln 18 which passes into the vessel 24 may be gas resulting from combustion of a high-sulphur fossil fuel or may be a process gas resulting from a treatment carried out in the kiln. In any case, the gas contains gaseous pollutants and an objectionably high percentage of sulphur dioxide. The inlet through which the gas enters the vessel 24 is so arranged in relation to the interior of the vessel 24 as to insure that the gas will have a vigorous, turbulent flow within the vessel. Thus, the sorbent material into the vessel 24 via inlet 26 will be uniformly dispersed through the entering gas stream and will be carried along with the gas through the vessel. The sorbent materials will contain lime (CaO) or alkali enter the vessel 24 by two routes. One of these routes provides for the feeding of a supply of the new calcined lime dust from the suspension heater or furnace 31 to the inlet 26 via a duct 33 as previously mentioned.

The other route provides for recirculating the lime dust which has already passed through the adsorption vessel 24 and has been separated from the gas by a cyclone 28. This second route comprises a duct 41 connected to a conveyor 42 which receives lime dust from a hopper 43 through an airlock 30 associated with the cyclone 28.

Off-gas from the preheat negative-pressure chamber or wind box 17A that passes through the grate is directed by means of a suitable duct 51 to a dust collector 52. From the dust collector 52, the gas is drawn by means of a preheat fan 53 and directed into a duct 54 and thence to an inlet of a booster heater 55 which is in communication with the interior of the preheat zone 17. The recycled preheat gas at an elevated temperature is utilized in the preheat zone for the material on the grate. By utilizing the booster heater 55 directly in communication with the preheat zone 17, the preheat off-gas from the negative-pressure chamber 17A, for example about 35%, is recycled and utilized in the system. The recycling of the preheat gas reduces the volume of gas required from the kiln, thereby allowing optimum kiln control. By providing the mechanical dust collector 52, protection is afforded to the fan 53.

Excess gas from the preheat negative-pressure chamber 17A, for example about 65%, is passed to a combustion chamber 61 via a duct 63 which operates in conjunction with the booster heater 55 to burn unburned kerogen material and combustibles in the off-gas. These unburned kerogen materials are pollutants which require relatively high temperature to effect their burning. Thus, by providing the combustion chamber 61, an effective burning of the unburned kerogen is accomplished at about 1300 degrees F. or higher. These unburned kerogen volatiles also represent a fair amount of heat which can be utilized in the system to reduce the cost of the energy that is necessary to operate the system. As shown in the drawing, the combustion chamber 61 communicates with a combustion quench duct 62 which is connected to receive gas from the cyclone 28 that is connected to the adsorbent vessel 24. The duct 62 has two temperature zones 62A and 62B; the temperature in the duct 62 in the upper zone 62A thereof is in the range of 1300 degrees F. The combined gas from the kiln via cyclone 28 and the preheat off-gas via the furnace 61 passes through the upper zone 62A of duct 62 and, flows to the lower zone 62B for quenching, to drop the temperature from 1300 degrees F. to a usable temperature of around 875 degrees F. before the gas is passed to the dust separators 76 and 92.

To effect quenching of the gas in the zone 62B, ambient quench air is added via a manifold 67 under the control of a damper 68. An alternate source of quench air can be had from the cooler 19 exhaust duct 73 to the manifold 67.

Should it be necessary to effect additional scrubbing of the gas to remove additional sulphur, lime bearing dust from the cyclone 28 is directed via a dust overflow duct 69 connected to a feeder 71 and thence to another duct 72 which includes an airlock connected into the lower portion 62B of the duct 62. The addition of the lime bearing dust into the lower portion 62B of duct 62 also aids in cooling the dust in the gas passing through the duct. Thus, the temperature of the gas in the upper zone 62A of the duct 62 is about 1300 degrees F., and as it passes into the lower zone 62B its temperature is modified to about 875 degrees F. with sulfur being removed from the gas.

From the quenching zone 62B of the duct 62, the gas is directed into a mechanical dust separator 76 which incorporates a heat exchanger 76A wherein the temperature of the gas is dropped from about 875 degrees F. to about 740 degrees F. The gas exits from the heat exchanger at 740 degrees F. into a duct 77 which is connected to the inlet side of a down-draft drying fan 78. A bleed-in 79 is provided in the duct 77 to add a small amount of ambient air into the gas stream to aid in modifying the gas temperature.

The fan 78 operates to direct the gas from the mechanical dust separator 76 into a duct 81 and thence into the drying zone 16 to effect down-draft drying of the agglomerates on the grate 20 passing through the zone. The temperature of the gas into the down-draft drying zone 16 is about 400 degrees F.

Excess gas at 400 degrees F. from the fan 78 not required for the drying operation is bypassed around the drying zone 16 via a duct 82 which is connected to a waste gas duct 83. The excess gas combines with the off-gas from the negative-pressure wind box 16A.

Another route is provided for the quench gas from the duct 62 and is represented by a connecting duct 91 communicating with a mechanical dust separator 92. As previously mentioned, the temperature of the gas in the duct 91 is about 875 degrees F. which is higher than desirable for the dust separator 92. Thus, an ambient air bleed-in 93 is provided to modify the gas temperature so that it enters the dust separator 92 at about 850 degrees F. Gas from the dust separator 92 is drawn therefrom via a duct 94 by an up-draft drying fan 95 connected to the positive-pressure wind box 14A of the drying zone 14. In front of the fan 95 there is provided an ambient air bleed-in 96 to modify the temperature of the gas to 450 degrees F. Off-gas from the up-draft drying zone 14 is directed to the fan 78 where it combines with the gas from the dust separator 76 to maintain the gas to the fan 78 at a modified relatively low temperature of 400 degrees F. so that the kerogen in the material is retained until it passes into the preheat zone 17 where a substantial portion will be burned and the heat utilized in the process.

Off-gas from the negative-pressure chamber 16A of the down-draft drying zone 16 is directed by means of the duct 83 to a waste gas fan 98 and thence to the bag house 87.

Dust from the mechanical dust separators 76 and 92 are passed to a waste duct 84 and thence to a bag house duct 86. A bag house 87 of conventional design is connected to receive the waste dust and operates to effect a final purging of sulfur from the waste gas. This step effects a further cooling of the dust and a reduction in the $SO_2$ pollutants to about 200 p.p.m. that is passed to the stack 88.

The gas from the mechanical separator 92 to the up-draft drying zone 14 via duct 103 operates to raise the temperature of the off-gas from the up-draft drying zone to about 250 degrees F., which is above the sulfur acid dew point. This off-gas from the up-draft drying zone at about 250 degrees F. is used as quench air to regulate the temperature of the gas going into the down-draft drying zone 16. The use of this gas as quench air materially reduces the amount of ambient air that needs to be added to the system, thus reducing the total volume of gas being handled in the system. This also reduces considerably the amount of gas going to the waste gas dust collector.

As previously mentioned, the gas from separator 92 via the up-draft drying fan 95 to the positive-pressure chamber 14A of the up-draft drying zone 14 is reduced from 850 degrees F. to about 450 degrees F., which is somewhat higher than that needed in up-draft drying. The reason that this temperature is higher than that utilized in down-draft drying is because it is going through the steel grate components and is tempered by passing through these grates so that a slightly higher temperature can be utilized. It is highly desirable to maintain the grate in the up-draft drying zone at a higher temperature because of the high amount of sulphur and kerogen in the agglomerate, wherein the dropping of the wet agglomerate onto the grate as it enters the up-draft drying zone has the potential for creating sulphuric acid and oily kerogen and dust which would tend to adhere to the grates. By maintaining a relatively hot grate in the up-draft drying zone, we minimize the potential for the development of sulphuric acid problems and a potential build-up of dust and oil on the grate components.

Excess gas from the separator 92 not needed for up-draft drying is directed via duct 101 and a fan 102 into a duct 103 that is connected to the up-draft drying zone 14. The temperature of this gas is about 850 degrees F. and serves to modify the temperature of the gas passing through the grate and the material from the positive-pressure wind box 14A to about 250 degrees F., raising the temperature of this gas above the sulfuric acid dew point. The temperature-modified gas passing from the zone 14 enters a duct 104 that is in communication with duct 77 ahead of the fan 78. Thus, the temperature-modified gas from duct 104 and a small amount of ambient air from bleed-in 79 serves to modify the 740-degree F. temperature gas from the separator 76 to effectively reduce the temperature of the gas to fan 78 to 400 degrees F. This temperature modifying effect of the gas from duct 104 materially reduces the amount of ambient air that is required to be bled in by the bleed-in 79, thus reducing the waste gas volume.

Excess gas from the fan 102 is also bypassed to the waste gas duct 83 via a connecting duct 106. Since the bypassed gas from the duct 106 is at about 850 degrees F., it has a modifying effect on the 250-degree F. temperature down-draft waste gas from negative-pressure wind box 16A. Thus, the temperature of the combined waste gas in the waste gas duct 83 is about 300 degrees F. above the sulfuric acid dew point.

Additional lime dust, if required for additional sulfur removal, is supplied from the hopper 29 via a conveyor system represented by the line 111. The conveyor system 111 is arranged to deliver the lime dust to a furnace 112 which is similar to the furnace 31. The calcined dust is dropped into a duct 114 which connects the cyclone 28 to the duct 62. This additional calcined dust enters duct 62 at the upper portion thereof in which the temperature is at about 1300 degrees F. to insure a reaction between the lime and sulfur.

EXAMPLE

For the purposes of the test, emission gas was simulated by combustion gases from a natural gas fuel burner into which pure carbon dioxide and sulfur dioxide gas were injected in the emission gas duct, ahead of the gas inlet to the adsorption chamber. The rate of carbon dioxide gas was such as to bring the carbon dioxide content of gas entering the adsorption chamber 25 to a base level of 25% by volume. The rate of injection of sulfur dioxide gas such as to bring the sulfur dioxide content of gas entering the adsorption chamber 24 to a base level of 5200 p.p.m. This base level took account of the sulfur content of the coal that was used to fuel the burner of the calcining furnace but did not take account of sulfur present in the adsorption medium. The powdered coal (10,500 BTU/lb.) was fed at a rate of 22 lbs./hr. (10 kg./hr.) to the calcining furnace 31.

The raw feed to the calcining furnace 31 was kerogen-bearing Colorado shale found to have the following analysis:

| | |
|---|---|
| CaO | 44.1% |
| $SiO_2$ | 9.2 |
| $Al_2O_3$ | 3.0 |
| $Fe_2O_3$ | 1.2 |
| MgO | 0.5 |
| $SO_3$ | 2.2 |
| Alkalis ($K_2O$, $Na_2O$) | 1.2 |
| L.O.I. (i.e., materials lost on ignition-$CO_2$ and kerogen) | 38.5 |
| | 99.9 |

The gas passing through the adsorption chamber 24 had a 25% $CO_2$ content, derived from the combustion gas employed for simulation of emission gas, from fuel burned for calcining, and by release from the adsorption medium in calcining and the balance injected pure carbon dioxide gas. Oxygen content of the gas through the adsorption chamber was 4%.

During the test run, temperatures at the following specified locations were found by periodic measurement to range between the values set forth:
Leaving calcining vessel 31: 750°–1050° C.
In adsorption zone 24: 770°–830°
In duct ahead of emission gas inlet: 860°–930°
In the reheater: 740°–850°

It should be noted that the thermal insulation of the pilot plant, although adequate for test purposes, would have been unsatisfactory for efficient gas scrubbing in actual operation, and heat losses due to insulation deficiencies are reflected in some of the above temperature values. With completely satisfactory insulation, there would probably be no need to use the reheater.

During the test period, the rate at which new shale material was fed into the system was measured on the basis of the CaO content of the feed material and was 54 lbs./hr. (24.5 kg./hr.). The feed material was comminuted to a Blaine Number of 6000. Discharge of material to the waste chamber was at the rate of 30 lbs./hr. (13.67 kg./hr.), and material was discharged to the bag house 81 at the rate of 80 lbs./hr. (36.3 kg./hr.). It must be borne in mind that the weight of discharge material includes both the weight of sulfur dioxide adsorbed by the medium and that of fly ash from combusted coal (at the rate of 0.8 kg. per hour) which was separated from the gas stream along with the adsorption medium.

The amount of adsorbing medium constantly in the system as a recirculating load was 160 to 185 lbs. (72.6 to 83.9 kg.). The ratio of CaO content of fresh feed material to $SO_2$ content of the simulated emission gas was 4.2 times that needed for stoichiometric reaction.

In the apparatus used for these tests vessel 24 was 27 feet in height, with an internal diameter of 10.5 in., and gas was drawn therethrough at a velocity which conveyed adsorbing medium therethrough (a minimum of 25 ft./sec.).

At the gas outlet of the cyclone 28, at a location where no dilution of the scrubbed emission gas had occurred, the $SO_2$ content of the emission gas was found to be 500 p.p.m., measured with an accuracy of ±30 p.p.m. On the basis of the nominal 500 p.p.m. value and the 5200 p.p.m. base line value, the system was removing 90% of the sulfur content of the emission gas. The $SO_2$ content of the emission gas is expected to be further reduced by additional adsorption in the balance of system and by natural dilution by other process gases to at least 200 p.p.m.

For removal of sulfur and phosphorous gases from emission gases, lime (calcium oxide) will naturally be the preferred adsorbing medium, due to its low cost and availability; but where, for example, titanium oxide is to be recovered from emission gas, it may be desirable to use an oxide of one of the other alkali earth metals, as to take advantage of special properties of such adsorbing medium in its combination with the recovered or adsorbed material.

The embodiment of the invention in which an exclusive property or privilege is claimed are defined as follows:

1. An apparatus for recycling the internal gas of a pyro-processing material treating system (10) in which cement material in the form of wet agglomerate is progressed by grate means (20) through a drying chamber 16, a preheat chamber (17) having a negative-pressure wind box (17A), a kiln (18) and a cooler (19);
   a dust separator (52) connected to receive off-gas from the negative pressure wind box (17A) of the preheat chamber (17);
   duct means (51) connecting said dust separators (52) to the negative pressure wind box (17A) of the preheat chamber (17);
   a preheat fan (53) connected to draw the cleansed gas from said dust separator (52) via interconnecting duct means and pass it to said booster heater (55) to elevate the temperature of the off-gas prior to the gas being recycled back into the preheat chamber (17) and to said combustion chamber to burn the combustibles prior to the gas being utilized in the drying chamber (16) as process heat;
   duct means connected to communicate between said dust separator (52) and said preheat fan (53);
   a booster heater (55) in communication with said preheat fan (53) connected to receive cleansed gas from said booster heater (55) to elevate the temperature of the off-gas prior to the gas being recycled back into the preheat chamber (17);
   duct means (54) connecting said booster heater (55) with said preheat fan (53);
   a combustion chamber (61) connected to receive off-gas from said preheat fan (53) to burn the combustibles therein prior to the gas being utilized in the drying chamber (16) as process heat;
   duct means (54, 63) connected to direct off-gas from the preheat fan (53) to said combustion chamber (61);
   a quench chamber (62) connected to receive kiln off-gas flowing through the preheat chamber (17);
   gas conducting means (24, 28, 114) operable between the kiln (18) and the quench chamber (62) to direct kiln off-gas to said quench chamber;
   a final dust collector (87) connected to receive waste gas from the system prior to the gas being wasted to atmosphere; and,
   a first means (76, 77, 78, 81) connected to direct gas from said quench chamber (62) to the drying zone (16);
   second means (83, 98, 86) connected to direct off-gas from said drying chamber (16) to said final dust collector (87).

2. Apparatus according to claim 1 including a gas scrubbing means (24) including gas conducting duct means interposed between said gas quench means (62) and the preheat chamber (17) and connected to receive the kiln off-gas flowing through the preheat chamber, said scrubbing means (24) being operable to produce turbulent flow of the gas flowing therethrough; and,
   feed means (29, 32, 31, 33) operably connected for introducing a sorbent material into the turbulent gas flow in said gas scrubbing means (24) at a temperature sufficiently high enough to cause said sorbent material to chemically react with the gas flowing therethrough to adsorb $SO_2$ pollutants from the gas stream.

3. Apparatus according to claim 2 including a cyclone (28) operably connected by duct means to receive dust ladden gas from said scrubber means (24); and,
   dust recirculating means (30, 42, 41) connected to direct dust from said cyclone (28) into the turbulent gas flow through said scrubbing means (24).

4. Apparatus according to claim 3 including;
   a supply hopper (43) connected to receive dust from said cyclone (28);
   air lock means (30) connected between said supply hopper (43) and said cyclone (28); and,
   means (69, 71, 72) to supply dust from said supply hopper (43) to said gas quench means (62) to effect additional scrubbing of the gas and temperature quenching of the dust passing through said quench means (62).

5. Apparatus according to claim 1 or 4 including a dust separator (76) connected by operable duct means to said quench means including interconnecting gas conducting means (62) to receive a portion of the quench gas therefrom;
   a drying supply fan (78) connected by means of gas conducting duct means (77) to receive cleansed gas from said dust separator (76);
   duct means (81) connected to said drying supply fan (78) and to said drying zone (16) for directing the gas from said drying fan (78) to said drying zone as down-draft drying heat;
   a vent duct (83) connected to receive off-gas from the negative-pressure wind box (16A) of said drying zone (16);
   a second duct means (82) connected to receive excess gas not required for down-draft drying heat from said drying supplying fan (78) and to direct the gas to combine with down-draft drying off-gas; and,
   a waste gas fan (98) connected to receive waste gas from said vent duct (83), said waste gas fan being connected to direct the gas from said vent waste gas duct (83) to said final dust collector (87).

6. Apparatus according to claim 5 wherein there is included in the pyro-processing system (10) an up-draft drying zone (14) having a positive-pressure wind box (14A) in which the wet agglomerate is subjected to preconditioning drying prior to passing to the down-draft drying zone;

a second dust separator (92) connected to receive a portion of the quench gas from said quench means (62); and, an up-draft supply fan (95) connected to receive cleansed quench gas that has passed through said dust separator (92) and operative to direct the gas to the positive-pressure wind box (14A) of the up-draft drying zone as drying heat, including interconnecting duct means;

an up-draft drying zone bypass fan (102) connected by operable duct means (101, 103) to receive excess quench gas from the said separator (92) and to direct a portion of the excess quench gas into the up-draft drying zone (14) to combine with the off-gas passing through the material bed on the grate (20) in the up-draft drying zone (14) to thereby have the relatively high temperature of the gas from the separator (92) modify the relatively low-temperature gas that has passed through the material bed in the up-draft drying zone (14) to elevate the temperature of the relatively low-temperature gas; and, duct means (104) connected to receive the temperature modified off-gas from the up-draft drying zone (14) and to direct it into a duct means (77) upstream of the drying supply fan (78) to modify the temperature of the gas supplied from the separator (76).

7. Apparatus according to claim 6 including duct means (106) connected to direct a portion of the quenched gas not utilized in the up-draft drying zone (14) to effect the combining of the gas with waste off-gas not utilized in the drying zone as down-draft drying heat and the excess gas not required for down-draft drying heat so that the combined waste gases in said vent waste gas duct (83) are directed to the final dust collector (87).

8. Apparatus according to claim 6 including gas temperature modifying means (96) connected to modify the temperature of the quenched gas supplied to said up-draft drying zone (14) prior to the quenched gas being directed to said up-draft drying supply fan (95).

9. Apparatus according to claim 5 including a dust separator (76) to receive the quenched gas; and, gas temperature modifying means (79) including duct means (77) connected to modify the temperature of the quenched gas supplied to said drying zone (16) prior to the quenched gas being directed to said drying supply fan (78).

10. Apparatus according to claim 8 wherein there is a heat exchange means (76A) operably connected to initially modify the temperature of said quenched gas prior to the temperature of said quenched gas being modified by said gas temperature modifying means (79).

11. Apparatus according to claim 6 wherein said first (76) and second (92) dust separators are connected via a conveying means (84) to direct the separated dust from said quenched gas to said final dust collector (87).

12. Apparatus according to claim 5 including a source of sorbent material (29, 111); and, means (112) to introduce the sorbent material into the gas stream prior to the gas being quenched.

13. Apparatus according to claim 11 wherein said sorbent material is obtained from a supply of lime dust (29); and, said means (112) is a calcining furnace connected to receive the lime dust and to calcine it, said furnace (112) being operably connected to introduce the calcined lime dust into the gas stream prior to the gas being quenched in said quench zone (62B).

* * * * *